(12) United States Patent
Karpey et al.

(10) Patent No.: US 9,380,041 B2
(45) Date of Patent: Jun. 28, 2016

(54) IDENTIFICATION, VERIFICATION, AND AUTHENTICATION SCORING

(71) Applicant: Bank of America Corporation, Charlotte, NC (US)

(72) Inventors: David Karpey, Harrisburg, NC (US); Jenny Rosenberger, Middleton, DE (US)

(73) Assignee: Bank of America Corporation, Charlotte, NC (US)

( * ) Notice: Subject to any disclaimer, the term of this patent is extended or adjusted under 35 U.S.C. 154(b) by 55 days.

(21) Appl. No.: 14/041,827

(22) Filed: Sep. 30, 2013

(65) Prior Publication Data
US 2015/0095986 A1    Apr. 2, 2015

(51) Int. Cl.
 H04L 29/06    (2006.01)
(52) U.S. Cl.
 CPC .................................... H04L 63/08 (2013.01)
(58) Field of Classification Search
 CPC ............. H04L 63/0861; H04L 9/3231; H04L 63/1433; H04L 9/0866; H04L 9/0872; H04L 63/08; G06F 2221/2103; G06F 2221/2111
 See application file for complete search history.

(56) References Cited

U.S. PATENT DOCUMENTS

| | | | |
|---|---|---|---|
| 8,726,344 B1 * | 5/2014 | Amidon et al. ............. | 726/2 |
| 2004/0190687 A1 * | 9/2004 | Baker ............... | H04M 3/4933 379/88.01 |
| 2006/0161435 A1 * | 7/2006 | Atef et al. ............... | 704/246 |
| 2007/0169178 A1 * | 7/2007 | Keohane et al. ............ | 726/4 |
| 2009/0006230 A1 * | 1/2009 | Lyda et al. ............... | 705/35 |
| 2010/0293090 A1 * | 11/2010 | Domenikos et al. ......... | 705/38 |
| 2011/0260832 A1 * | 10/2011 | Ross et al. ............... | 340/5.84 |
| 2012/0079592 A1 * | 3/2012 | Pandrangi ............... | 726/22 |
| 2013/0179692 A1 | 7/2013 | Tolba et al. | |
| 2013/0204430 A1 | 8/2013 | Davey et al. | |
| 2013/0204784 A1 | 8/2013 | Ogden | |
| 2013/0212640 A1 | 8/2013 | White et al. | |
| 2013/0212840 A1 | 8/2013 | Ahmadshahi | |
| 2013/0218758 A1 | 8/2013 | Koenigsbrueck et al. | |
| 2013/0218764 A1 | 8/2013 | Fujii | |
| 2013/0222133 A1 | 8/2013 | Schultz et al. | |
| 2013/0225128 A1 | 8/2013 | Gomar | |
| 2013/0226582 A1 | 8/2013 | Aley-Raz et al. | |
| 2013/0227651 A1 | 8/2013 | Schultz et al. | |
| 2013/0227666 A1 | 8/2013 | White et al. | |
| 2013/0232073 A1 | 9/2013 | Sheets et al. | |
| 2013/0238121 A1 | 9/2013 | Davey et al. | |

(Continued)

*Primary Examiner* — Andrew Nalven
*Assistant Examiner* — Mary Li
(74) *Attorney, Agent, or Firm* — Banner & Witcoff, Ltd.; Michael A. Springs

(57) ABSTRACT

Systems and methods are provided for responding to a communication received from an individual. An identification score may be obtained for the communication that indicates the likelihood that a claimed identity of the individual is the actual identity of the individual. A verification score for the communication may also be obtained that indicates the likelihood a purported source of the communication is the actual source of the communication. An authentication score for the communication may additionally be obtained that indicates the likelihood the individual has been authenticated. An overall score for the communication may be generated and based on the identification score, verification score, and authentication score. A response to the communication may thus be determined based on the overall score. The response may be a grant or denial of access to one or more services requested by the individual through the communication.

20 Claims, 10 Drawing Sheets

(56) References Cited

U.S. PATENT DOCUMENTS

| | | |
|---|---|---|
| 2013/0238905 A1 | 9/2013 | Dinha |
| 2013/0253919 A1 | 9/2013 | Gutierrez et al. |
| 2013/0262873 A1 | 10/2013 | Read et al. |
| 2013/0263233 A1 | 10/2013 | Dinha |
| 2013/0263284 A1 | 10/2013 | Black et al. |
| 2013/0267204 A1 | 10/2013 | Schultz et al. |
| 2013/0272511 A1 | 10/2013 | Bouzid et al. |
| 2013/0282637 A1 | 10/2013 | Costigan et al. |
| 2013/0283201 A1 | 10/2013 | Costigan et al. |
| 2013/0283378 A1 | 10/2013 | Costigan et al. |
| 2013/0290136 A1 | 10/2013 | Sheets et al. |
| 2014/0096177 A1* | 4/2014 | Smith et al. .............. 726/1 |

* cited by examiner

IDENTIFICATION, VERIFICATION, AND AUTHENTICATION SCORING

TECHNICAL FIELD

The present invention generally relates to identification and authentication of an individual and particularly relates to determining identification

BACKGROUND

For the convenience of its customers, banking institutions may provide access to bank accounts and other banking services over the phone or through the Internet. In order to preserve the security of bank account information, customer information, and other secured information, banking institutions are dedicated to ensuring only authorized individuals can access such information. Therefore, banking institutions may welcome improved approaches to determining whether to grant access to banking systems and services that are both convenient and secure.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a method for responding to a communication from an individual. A communication may be received from an individual, and an identification score may be obtained for the communication. The identification score may indicate the likelihood that a claimed identity of the individual is the actual identity of the individual. A verification score for the communication may also be obtained. The verification score may indicate the likelihood that a purported source of the communication is the actual source of the communication. An authentication score for the communication may additionally be obtained. The authentication score may indicate the likelihood that the individual has been authenticated. An overall score for the communication may be generated. The overall score may be based on the identification score, the verification score, and the authentication score. A response to the communication may thus be determined based on the overall score. The response may be a grant or denial of access to one or more services requested by the individual.

A second aspect described herein provides a system for responding to a communication received from an individual. The system may include at least one processor and memory storing computer-readable instructions that, when executed by the at least one processor, cause the system to provide components for responding to a communication received from an individual. A communication portal may receive a communication from an individual. An identification scoring engine may generate an identification score that indicates the likelihood a claimed identity of the individual is the actual identity of the individual. A verification scoring engine may generate a verification score that indicates the likelihood a purported source of the communication is the actual source of the communication. An authentication scoring engine may generate an authentication score that indicates the likelihood the individual has been authenticated. A scoring aggregator may generate an overall score for the communication based on the identification score, verification score, and authentication score. A rules engine may determine a response to the communication based on the overall score.

A third aspect described herein provides non-transitory computer-readable media having instructions that when executed cause a computing device to determine a response received from an individual. The computing device may receive a communication from an individual at a communication portal. The communication may request access to banking services from a banking system. The computing device may obtain an identification score for the communication using an identification scoring engine. The identification score may indicate the likelihood that a claimed identity of the individual is the actual identity of the individual. The computing device may also obtain a verification score for the communication using a verification scoring engine. The verification score may indicate the likelihood that the purported source of the communication is the actual source of the communication. The computing device may additionally obtain an authentication score for the communication using an authentication engine. The authentication score may indicate the likelihood that the individual has been authenticated. The computing device may generate an overall score for the communication using a scoring aggregator. The overall score may be based on the identification score, the verification score, and the authentication score. The computing device may grant the individual access to the requested banking services in response to a determination that the overall score is above an upper score threshold. The computing device may decline to grant the individual access to the requested banking services in response to a determination that the overall score is below a lower score threshold.

These and additional aspects will be appreciated with the benefit of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
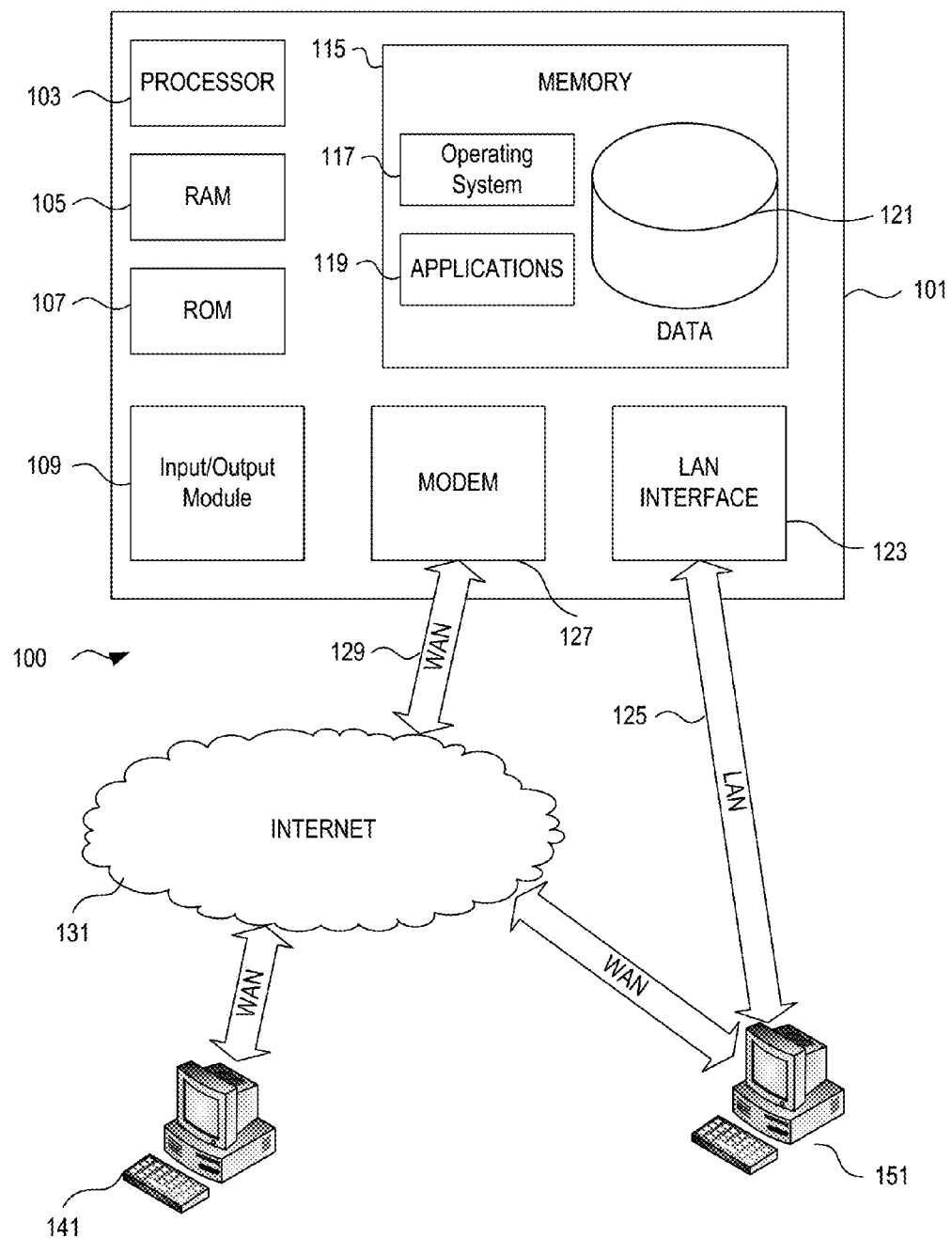
FIG. 1 is a block diagram of an example operating environment in which various aspects of the disclosure may be implemented.

Aspects described herein provide improved approaches to identifying, verifying, and authenticating an individual requesting access to secured systems or services. Aspects of the present disclosure may implemented, for example, to identify, verify, and authenticate a customer that contacts a banking system and requests access to bank account information, customer information, or other banking services. An identification, verification, and authentication scoring system ("scoring system") is provided that determines whether or not to grant an individual access to requested services based on information associated with the individual and information associated with a communication received from the individual.

For clarity, the following terminology is adopted for use in the present disclosure. Communications refer to electric or electronic communications received from an individual. Communications received from the individual may be one or more wired communications, one or more wireless communications, or a combination of wired and wireless communications. Examples of communications include phones calls from an individual via landline or cellular telephone networks, online communications via the Internet, and other types of electric or electronic communications that will be appreciated with the benefit of this disclosure. Through these communications, an individual may request and be granted access to one or more banking systems or services. Communication information refers to information associated with a communication received from the individual. Communication information may include information indicating the source of the communication. For a phone call, communication information related to the source of the phone call includes the phone number the phone call was placed from. For an online communication, communication information related to the source of the online communication includes one or more network addresses or device identifiers the online communication was transmitted from. The source of the communication also refers to a geographic location a phone call, online communication, or other type of communication originated at.

A claimed identity refers to an identity an individual represents as having. An actual identity refers to the true identity of an individual. Identification information refers to information that, either alone or in combination, indicates an identity of the individual. Examples of identification information include personal information associated with an individual (e.g., first and last name, birthday), information tokens associated with an individual (e.g., account number, customer number, phone number, mailing address, username, digital certificate), and other types of information associated with an individual. Identification information may be used to obtain authentication information, which may in turn be used to confirm whether the claimed identity of an individual is the actual identity of the individual.

It will be appreciated that individuals may misrepresent their actual identities and represent themselves as having a claimed identity that does not match their actual identity. Identification information may thus also be used to obtain an identification score that indicates the likelihood that a claimed identity is the actual identity of an individual. An identification score may be a value that quantifies the likelihood that a claimed identity is the actual identity of an individual. Other types of identification scores that indicate the likelihood that a claimed identity an individual is the actual identity of the individual may be selectively employed.

The ability to misrepresent at least some of the communication information associated with a communication will also be recognized. For example, a communication may misrepresent its source, e.g., the phone number a phone call is placed from, the network address or device identifier an online communication is transmitted from, or the geographic location the communication originated at. Accordingly, the communication information associated with a communication received from an individual may be verified for accuracy.

Verification information refers to information that indicates whether communication information associated with a communication is accurately represented. Verification information may include information indicating whether the purported source of a communication received from an individual is the actual source of the communication. The actual source of the communication refers to the true source of the communication, e.g., the true phone number a phone call was place from, the true network addresses or device identifiers an online communication was transmitted from, or the true geographic location a communication originated at. The purported source of a communication refers to the source the communication represented by the communication, e.g., the phone number a phone call represents as having been placed from, the network addresses or device identifiers an online communication represents as having been transmitted from, or the geographic location a communication represents as having originated at.

Verification information may be used to obtain a verification score. A verification score indicates the likelihood that that the communication information associated with the communication is accurately represented. The verification score may be a value that quantifies a likelihood that a purported source of the communication is the actual source of the communication. Other types of verification scores that indicate the likelihood communication information associated with a communication is accurately represented may be selectively employed.

In order to ensure that the claimed identity of the individual is the actual identity of the individual, the claimed identity individual may be authenticated. Authentication information refers to information that indicates whether the individual has been authenticated. Authentication information may include answers to security questions presented to an individual. Authentication information may also include information related to a comparison of a voice print for the individual to a stored voice print. The authentication information may be used to obtain an authentication score that indicates the likelihood that the individual has been authenticated. The authentication score may be a value that quantifies the likelihood that the claimed identity of the individual is the actual identity of the individual. Other types of authentication scores that indicate the likelihood that the claimed identity matches the actual identity of an individual may be selectively employed.

Furthermore, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

FIG. 1 illustrates a block diagram of at least a portion of a scoring system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the scoring system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to identify and authenticate individuals as well as verify communications received from those individuals.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that stores data used by the system 101. The network connections depicted in FIG. 1 include a local area network (LAN) 125 and a wide area network (WAN) 129, but may also include other networks. When used in a LAN networking environment, the system 101 is connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the scoring system 101 according to an illustrative embodiment of the disclosure may include computer executable instructions for invoking functionality related to processing and responding to access requests and to facilitating access reviews.

The scoring system 101 and/or terminals 141 or 151 may also be mobile terminals, such as smart phones, personal digital assistants (PDAs), and the like including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
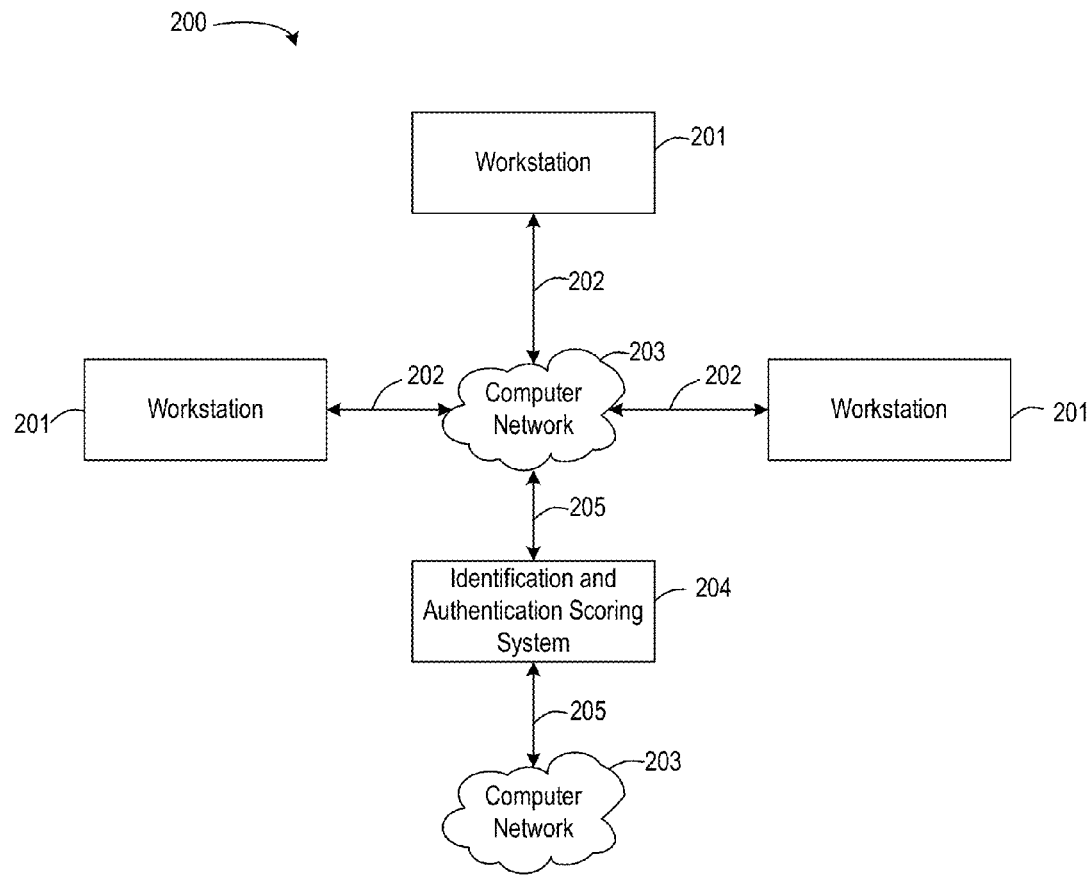
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the scoring system 204. In certain embodiments, workstations 201 may be different servers that communicate with the scoring system 204, or, in other embodiments, workstations 201 may be different points at which the scoring system 204 may be accessed. In system 200, the scoring system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the scoring system 204, such as network links, dial-up links, wireless links, hard-wired links, and the like The disclosure that follows in the figures may be implemented by one or more of the components in FIG. 1 and FIG. 2 and/or other components, including other computing devices.

Figure 3:
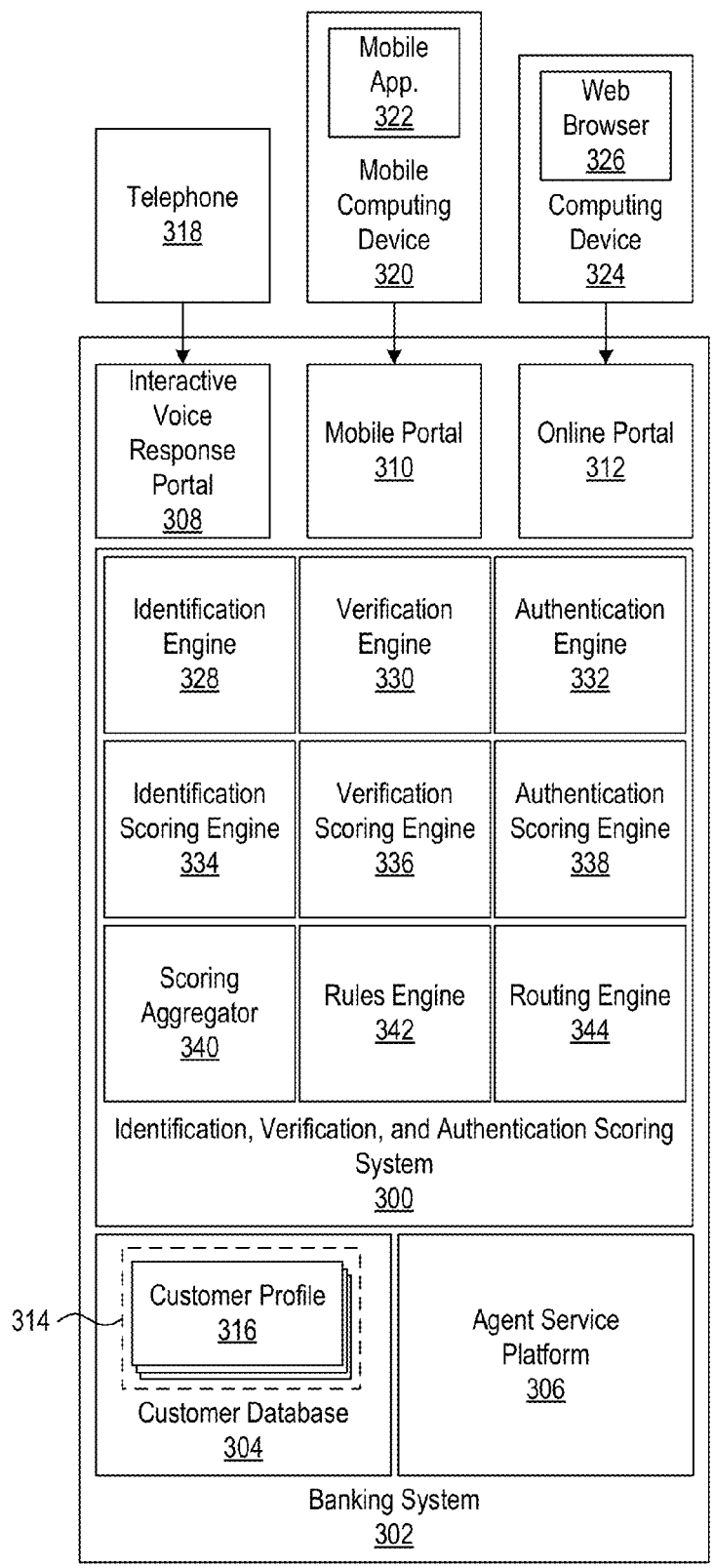
FIG. 3 is a block diagram of an example of an implementation of an identity, verification, and authentication scoring system.

Referring now to FIG. 3, a block diagram of an example of an implementation of an identification, verification, and authentication scoring system 300 is shown. The scoring system may be part of a banking system 302 that includes a customer database 304, an agent service platform 306, and one or more communication portals 308-312. The communication portals 308-312, in this example, include an interactive voice response (IVR) portal 308, a mobile portal 310, and an online portal 312. The banking system 302 may include additional components that have been omitted from FIG. 3 for the purpose of clarity.

The customer database 304 of the banking system 302, in this example, stores a set 314 of customer profiles 316. The customer profiles 316, in this example, include customer information relating to a bank customer. Customer information may include, for example, the name of the bank customer, contact information for the bank customer, and account information for the bank customer. Customer information may also include information the scoring system 300 may utilize to determine the identity or authenticate an individual such as answers to security questions, phone numbers or network address from which the individual has previously contacted the banking system, device identification numbers of devices the individual has previously used to contact the banking system, and other types of information that may be utilized to identify or authenticate an individual. Customer information may include other types of information related to bank customers, which will be appreciated by those knowledgeable in the art.

The agent service platform 306 is a platform that allows a customer service agent to access banking resources on behalf of an individual. Through the agent service platform 306, a customer service agent may access customer profile information, bank account information, and other information related to banking services for an individual. The customer service agent may also provide various banking services to the individual through the agent service platform. Such banking services may include, for example, updating personal information (e.g., mailing address), opening new accounts, closing existing accounts, transferring money between accounts, and other types of banking services provided remotely for the convenience of banking customers. A customer service agent may also utilize the agent service platform 306 to identify and authenticate the individual. Accordingly, the agent service platform 306 may be in communication with the customer database 304 to retrieve customer profiles 316 as well as customer information and security information associated with those profiles. In this way, a customer service agent may also perform steps to identify and authenticate an individual. For example, the agent service platform 306 may present security questions to pose to the individual during an authentication process. The agent service platform 306, in this example, may also present the answers to the security questions associated for comparison to the answers received from the individual. As described below, identification and authentication may additionally or alternative be performed automatically in some example implementations.

The IVR portal 308 provides access to the banking system 302 via a phone call received from a telephone 318. The IVR portal 308 may route the phone call and provide access to banking services in response to voice commands provided by the individual over the telephone 318. The telephone 318 may be, e.g., a landline telephone that access the IVR portal 308 through a public switched telephone network (PSTN) or may be a mobile telephone that accesses the IVR portal through a cellular network.

The mobile portal 310 provides access to the banking system 302 via a communication session with a mobile computing device 320. Communications used to access to the banking system 302 through the online portal 310 are referred to as mobile communications in this description. In some example implementations, mobile communications may include HyperText Transfer Protocol (HTTP) requests. The mobile portal 310 may provide access to banking services via a mobile application 322 ("mobile app" or "app") installed at the mobile computing device 320. Accordingly, the mobile computing device 320 may be, e.g., a smartphone, a palmtop computer, a tablet computer, and other types of mobile computing devices configured to run mobile applications. The mobile application 322 may thus be in communication with the mobile portal 310 through a wireless networks (e.g., a cellular network), wired networks (e.g., the Internet), or a combination of wired or wireless networks.

The online portal 312 provides access to the banking system 302 via a communication session with a computing device 324. Communications used to access to the banking system 302 through the online portal 312 are referred to as online communications in this description. In some example implementations, mobile communications may include HTTP requests. The online portal 312 may provide access to the banking system 302 over the Internet and may thus comprise include one or more web pages and web services. Accordingly, the computing device 324 may be in communication with the online portal 312 via a web browser 326 at the computing device. The computing device 324 may thus be, e.g., a desktop computer, a laptop computer, a tablet computer, a palmtop computer, a smartphone, and any other computing device capable of web access.

The portals 308-312 may prompt an individual for information such as identification information, and information that may be used to authenticate the identity of an individual. An individual may provide the requested information by speaking, typing, or keying the information into the telephone 318, mobile device 320, or computing device 324. In response to receipt of the information, the portals 308-312 may provide the information to the scoring system 300. The portals may also provide the scoring system 300 with communication information associated with a communication received from an individual.

The scoring system 300, in this example, includes: an identification engine 328; a verification engine 330; an authentication engine 332; an identification scoring engine 334; a verification scoring engine 336; an authentication scoring engine 338; a scoring aggregator 340; a rules engine 342; and a routing engine 344.

The identification engine 328, in operation, obtains identification information associated with an individual requesting access to the banking system 302 and provides the identification information to the identification scoring engine 334. The identification engine 328 may determine an identity of the individual based on information received from the individual. Accordingly, the identification engine 328 may prompt the individual for personal information or one or more identification tokens. The personal information or identification tokens received from an individual may thus correspond to the claimed identity of the individual. Additionally or alternatively, the identification engine 328 may derive identification information associated with the communication device the individual uses to contact the banking system 302. Accordingly, the identification engine 328 may determine a phone number, network address, or device identifier associated with the communication received from the individual.

In some example implementations, the identification engine 328 may be configured to determine the identity of the individual based on the voice of the individual. The identification engine 328 may prompt the individual to speak a key phrase that includes the first and last name of the individual. The audio sample that includes the key phrase may be converted to text, and the first name and last name may then be extracted from the text of audio sample. The identification engine 328 may thus utilize the first and last name extracted from the text of the audio as an identification token to determine the identity of the individual. More information related to determining the identity of an individual based on the voice of that individual may be found in commonly-owned U.S.

patent application Ser. No. 14/041,012 entitled "CUSTOMER IDENTIFICATION THROUGH VOICE BIOMETRICS" and filed on Sep. 30, 2013 which is incorporated by reference herein in its entirety.

The identification engine 328 may query the customer database 304 for a customer profile 316 matching the identification information received from the individual or derived from the communication. The identification engine 328 may also query the customer database 304 for information associated with the customer profile 316 that matches the identification information. If the individual provides an account number as identification information, for example, then the identification engine 328 may query the customer database 304 for a customer profile 316 having a matching account number. Other examples of queries the identification engine 328 may submit to the customer database 304 will be appreciated with the benefit of this disclosure. The identification engine 328 may also query the customer database for information related to previous communications associated with a customer profile 316.

The identification engine 328 may provide the identification information, customer profile information, and information related to previous communications associated with the customer profile to the identification scoring engine 334. As discussed in further detail below, the identification scoring engine 334 may generate an identification score based on this information.

The verification engine 330, in operation, obtains verification information associated with a communication received at one of the communication portals 308-312 from an individual requesting access to the banking system 302 and provides the verification information to the identification scoring engine 334. The verification engine 330, in this example, is configured to determine whether the communication accurately presents the communication information associated with the communication.

The verification engine 330 may, for example, be configured to determine whether the communication has accurately represented or misrepresented the source of the communication. In some example implementations, the verification engine 330 may be configured to determine whether a phone call has misrepresented the phone number the phone call was placed from. The verification engine 330 may additionally or alternatively be configured to determine whether a mobile communication or online communication has misrepresented a network address or device identifier the communication was transmitted from. The verification engine 330 may further be configured to determine whether the communication has misrepresented a geographic location the communication originated at. The verification information provided to the verification scoring engine 338 may thus include information related to the purported source of the communication, the actual source of the communication, and whether the purported source of the communication is the actual source of the communication. Various approaches and techniques to determining whether a communication has misrepresented its source are known to those skilled in the art and may be selectively employed in various implementations of the verification engine 330.

The verification engine 330 may provide the verification information to the verification scoring engine 334. As discussed in further detail below, the verification scoring engine 334 may generate a verification score based on this information.

The authentication engine 332, in operation, obtains authentication information associated with the individual. The authentication engine 332 may query the customer database 304 for security information associated with a customer profile 316 corresponding to the claimed identity of the individual. The security information may include security questions and associated answers. Accordingly, the authentication engine 332 may present security questions to the individual through one of the communication portals 308-312 and receive answers from the individual in response. The authentication information provided to the authentication scoring engine 338 may thus include the answers associated with the security questions and the answers received from the individual.

The security information may also include a stored voice print associated with a customer profile 316 associated with the claimed identity of the individual. Accordingly, the authentication engine 332 thus prompt the individual for a voice sample and provide the voice sample received from the individual to a voice biometrics engine (not shown). The voice biometrics engine may obtain a voice print based on the voice sample and compare the voice print the voice sample to the stored voice print associated with the customer profile 316. The authentication information provided to the authentication scoring engine 338 may thus also include information related to the comparison of the voice print to the stored voice print.

The authentication engine 332 may provide the authentication information to the authentication scoring engine 338. As discussed in further detail below, the authentication scoring engine 334 may generate an authentication score based on this information.

The identification scoring engine 334, in operation, generates an identification score for the individual requesting access to the banking system 302. The identification score, in this example, indicates the likelihood that the claimed identity of the individual is the actual identity of the individual. The identification score may be a value that quantifies the likelihood that the claimed identity of the individual is the actual identity of the individual. For example, the identification score may range from zero to one hundred (0-100) with values closer to zero indicating a relatively low likelihood that the claimed identity of the individual is the actual identity of the individual and values closer to one hundred indicating a relatively high likelihood that the claimed identity of the individual is the actual identity of the individual. The identification scoring engine 334 may receive the identification information from the identification engine 328 and use the identification information to determine the identification score. In some example implementations, the identification scoring engine 334 may refer to one or more rules maintained by the rules engine 342 when generating the identification score. The identification scoring engine 334 may provide the identification score to the scoring aggregator 340. Generating an identification score will be discussed in further detail below with reference to FIG. 7.

The verification scoring engine 336, in operation, generates a verification score for a communication received from the individual requesting access to the banking system 302. The verification score, in this example, indicates the likelihood that communication information associated with the communication (e.g., the source of the communication) is accurately represented. The verification score may be a value that quantifies the likelihood that communication information associated with the communication is accurately represented. For example, the verification score may range from zero to one hundred (0-100) with values closer to zero indicating a relatively low likelihood that communication information associated with the communication is accurately represented and values closer to one hundred indicating a relatively high likelihood that communication information associated with the communication is accurately represented. The verification scoring engine 336 may receive the verification information from the verification engine and use the verification information to determine the verification score. In some example implementations, the verification scoring engine 336 may refer to one or more rules maintained by the rules engine 342 when generating the verification score. The verification scoring engine 336 may provide the identification score to the scoring aggregator 340. Generating an identification score will be discussed in further detail below with reference to FIG. 8.

The authentication scoring engine 338, in operation, generates an authentication score for the individual requesting access to the banking system 302. The authentication score, in this example, indicates the likelihood that the individual has been authenticated. The authentication score may be a value that quantifies the likelihood that the individual has been authenticated. For example, the authentication score may range from zero to one hundred (0-100) with values closer to zero indicating a relatively low likelihood that the individual has been authenticated and values closer to one hundred indicating a relatively high likelihood that the individual has been authenticated. The authentication scoring engine 338 may receive the authentication information from the authentication engine and use the authentication information to determine the authentication score. In some example implementations, the authentication scoring engine 338 may refer to one or more rules maintained by the rules engine 342 when generating the authentication score. The authentication scoring engine 338 may provide the identification score to the scoring aggregator 340. Generating an authentication score will be discussed in further detail below with reference to FIG. 9.

The scoring aggregator 340, in operation, generates an overall score that may be used to route the communication from the individual. The scoring aggregator 340, in this example, receives the identification score from the identification scoring engine 334, the verification score from the verification scoring engine 336, and the authentication score from the authentication engine 338. Various approaches to generating the overall score may be selectively employed. In one example implementation, the overall score may be the arithmetic mean of the identification score, verification score, and authentication score. Other approaches to generating the overall score may be selectively employed.

The overall score corresponds to a confidence level that the individual requesting access to the banking services has been accurately identified and authenticated. In other words, the overall score corresponds to a confidence level that the individual requesting access to banking services is authorized to access those services. The overall score may be a value that quantifies this confidence level. For example, the overall score may range from zero to one hundred with values closer to zero indicating relatively low confidence that the individual is authorized to access the requested banking resources and values closer to one hundred indicating a relatively high confidence that the individual is authorized to access the requested banking resources. The scoring aggregator 340 may provide the overall score to the rules engine 342.

The rules engine 342, in operation, determines a response to a communication received from an individual based on the overall score generated for the communication. Since the overall score indicates a confidence level that an individual is authorized to access requested banking resources, the rules engine 342 may determine whether to grant or deny the individual access to the banking services requested. The rules engine 342 may employ thresholds to determine how to respond to a communication from an individual based on the overall score generated for that communication. Depending on the overall score for the communication, the rules engine 342 may determine, for example, deny access to the requested banking services and terminate the communication, grant access to the requested services and route the communication to the appropriate banking system that provides the requested services, or route the communication to the agent service platform 306 to allow a customer service agent to further assist the individual. Accordingly, the rules engine 342 may provide instructions to the routing engine 344 with respect to how to route the communication received from the individual.

The rules engine 342 may also be in communication with the identification scoring engine 334, the verification scoring engine 336, and the authentication scoring engine 338. The rules engine 342 may provide rules to the scoring engines 334-338, and the scoring engines may apply the rules when generating the respective identification, verification, and authentication scores. The rules may specify criteria that, when satisfied, cause the a scoring engine 334-338 to increase or decrease the score generated by that scoring engine. The criteria of the rules may relate to the identification, verification, or authentication information respectively received from the identification engine 328, verification engine 330, or authentication engine 332. The rules maintained by the rules engine 342 may be dynamically configurable to indicate a desired response to a communication or to indicate criteria that cause an identification, verification, or authentication score to be raised or lowered. The rules engine 342 will be discussed in further detail below with reference to FIG. 10.

The routing engine 344, in operation, routes a communication received from an individual based on instructions received from the rules engine 342. For example, the routing engine may route a phone call to the agent service platform 306 to connect the individual to a customer service agent. The routing engine may also route a mobile or online communication to resources that provide automated remote access to banking information and services. The routing engine 344 may also terminate the communication if the rules engine 342 determines the individual is not authorized to access the requested resources. In some example implementations, the routing engine 344 may forward the communication for investigation in response to instructions received from the rules engine.

Figure 4:
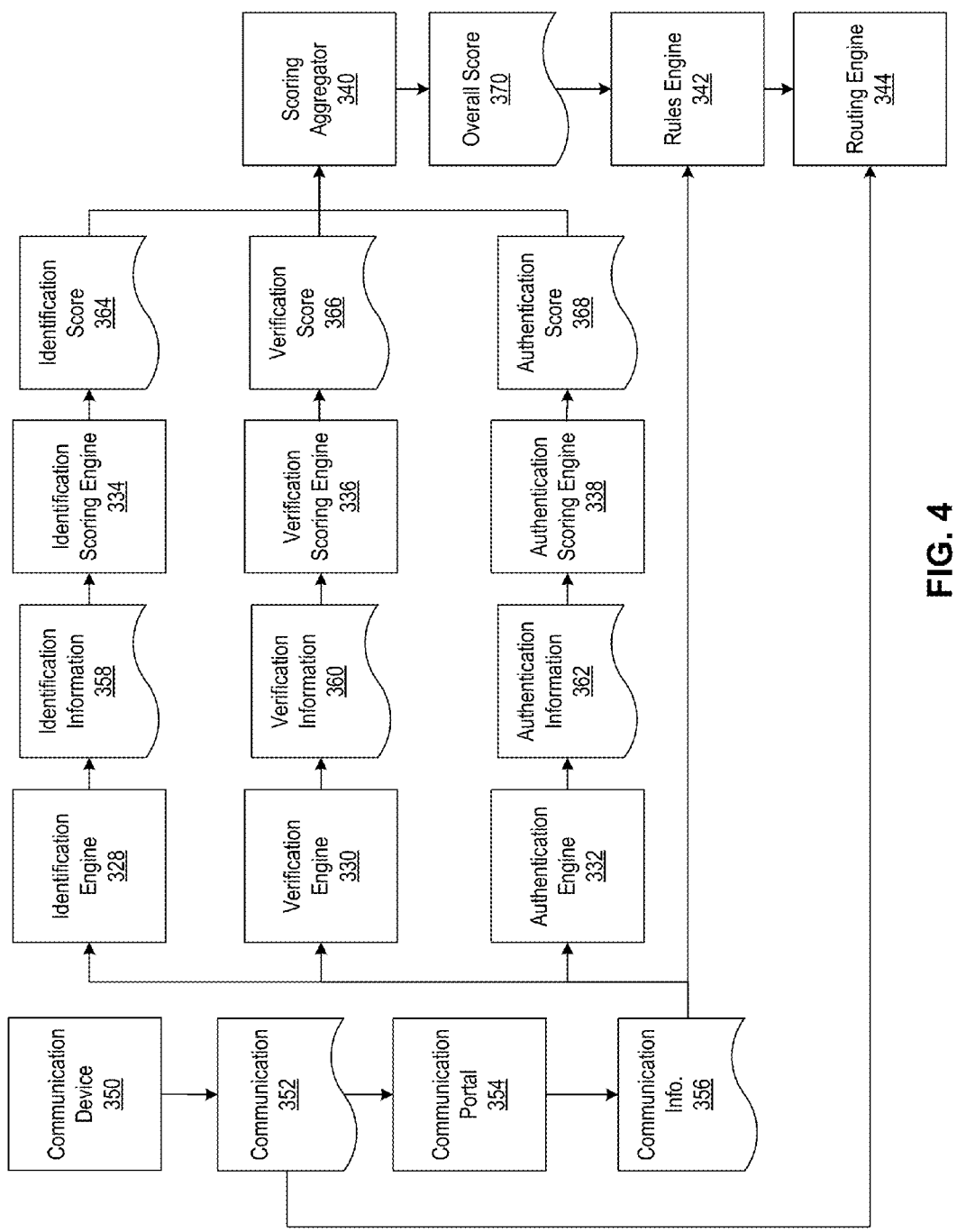
FIG. 4 is a block diagram of an example workflow corresponding to scoring and responding to an incoming communication.

Referring now to FIG. 4, a block diagram of an example workflow corresponding to scoring and responding to an incoming communication is shown. A communication device 350 may send a communication 352 to a communication portal 354 of, e.g., a banking system. As mentioned above, the communication device 350 may be, e.g., a landline telephone, a mobile telephone, a smartphone, or a computing device. As also mentioned above, the communication portal 354 may be an IVR portal, a mobile portal, or online portal. The communication portal 354 may provide obtain communication information 356 associated with the communication 352, and may provide the communication information to an identification engine 328, a verification engine 330, and an authentication engine 332.

The identification engine 328 may obtain identification information 358 based on the communication information 356, the verification engine 330 may obtain verification information 360 based on the communication information, and the authentication engine 332 may obtain authentication information 362 based on the communication information as described above. The identification engine 328 may provide the identification information 358 to the identification scoring engine 334, the verification engine 330 may provide the verification information 360 to the verification scoring engine 336, and the authentication engine 332 may provide the authentication information 362 to the authentication scoring engine as also described above. In turn, the identification scoring engine 334 may generate an identification score 364, the verification scoring engine 336 may generate a verification score 366, and the authentication coring engine 338 may generate an authentication score 368 as further described above.

The scoring aggregator 340 may receive the identification score 364, the verification score 366, and the authentication score 368. The scoring aggregator 340 may generate an overall score 370 based on the identification score 364, the verification score 366, and the authentication score 368 as described above. The scoring aggregator 340 may provide the overall score 370 to the rules engine 342, and the rules engine may instruct the routing engine 344 based on the overall score.

Figure 5:
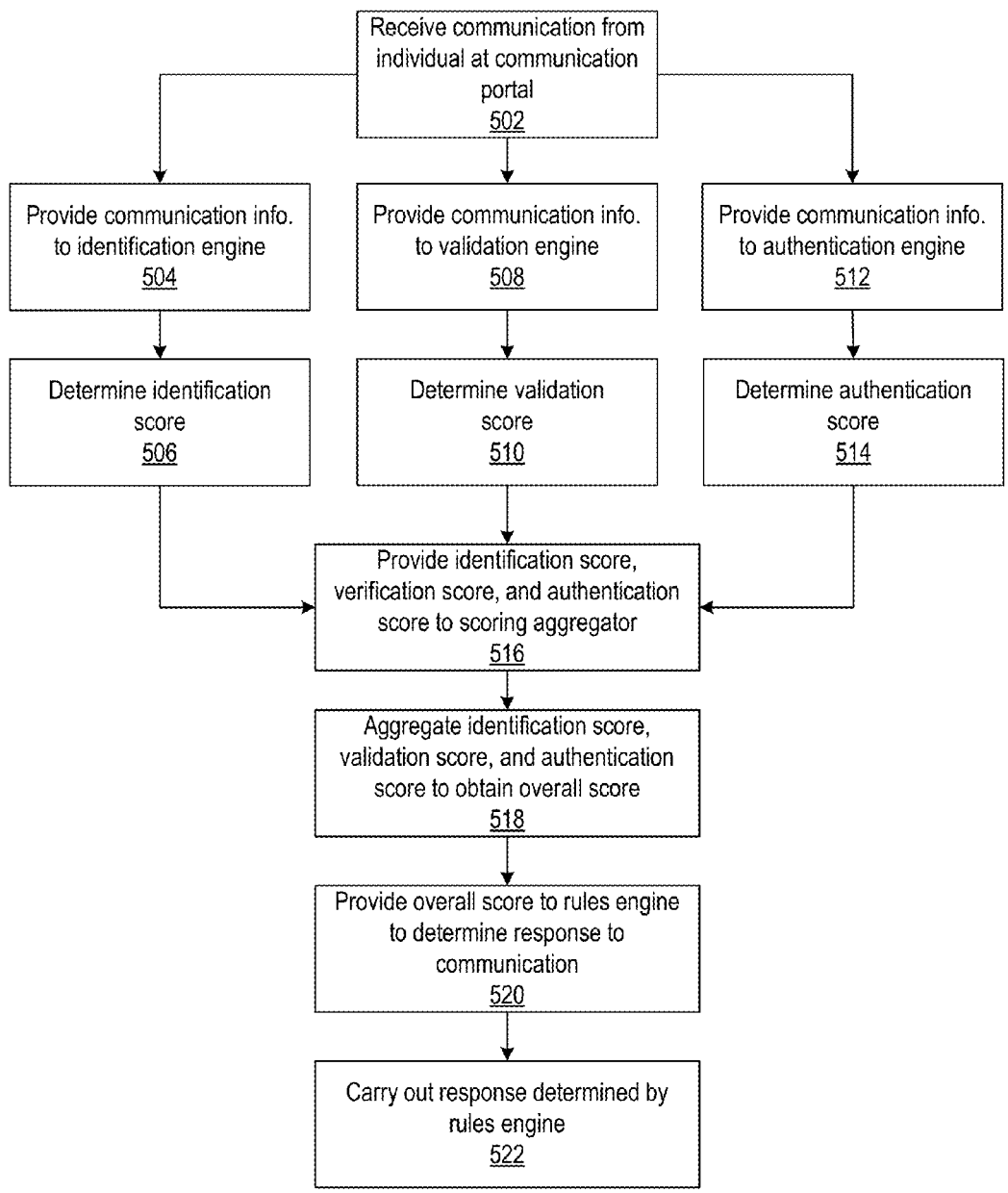
FIG. 5 is a flowchart of example method steps for scoring an incoming communication.

FIG. 5 is a flowchart 500 of example method steps for scoring an incoming communication. A communication may be received from an individual at a communication portal (block 502). The communication portal may provide at least a portion of the communication information associated with the communication received to an identification engine (block 504), and the identification engine may determine an identification score based at least in part on the communication information received (block 506). The communication portal may also provide at least a portion of the communication information associated with the communication received to a verification engine (block 508), and the verification engine may determine a verification score based at least in part on the communication information received (block 510). The communication portal may additionally provide at least a portion of the communication information associated with the communication received to an authentication engine (block 512), and the authentication engine may determine an authentication score based at least in part on the communication information received (block 514).

The identification score, verification score, and authentication score may be provided to the scoring aggregator (block 516), and the scoring aggregator may aggregate these scores to obtain the overall score for the communication (block 518). The scoring aggregator may provide the overall score to the rules engine in order to determine a response to the communication (block 520). The response indicated by the rules engine may then be carried out (block 522) in response to the communication.

Figure 6:
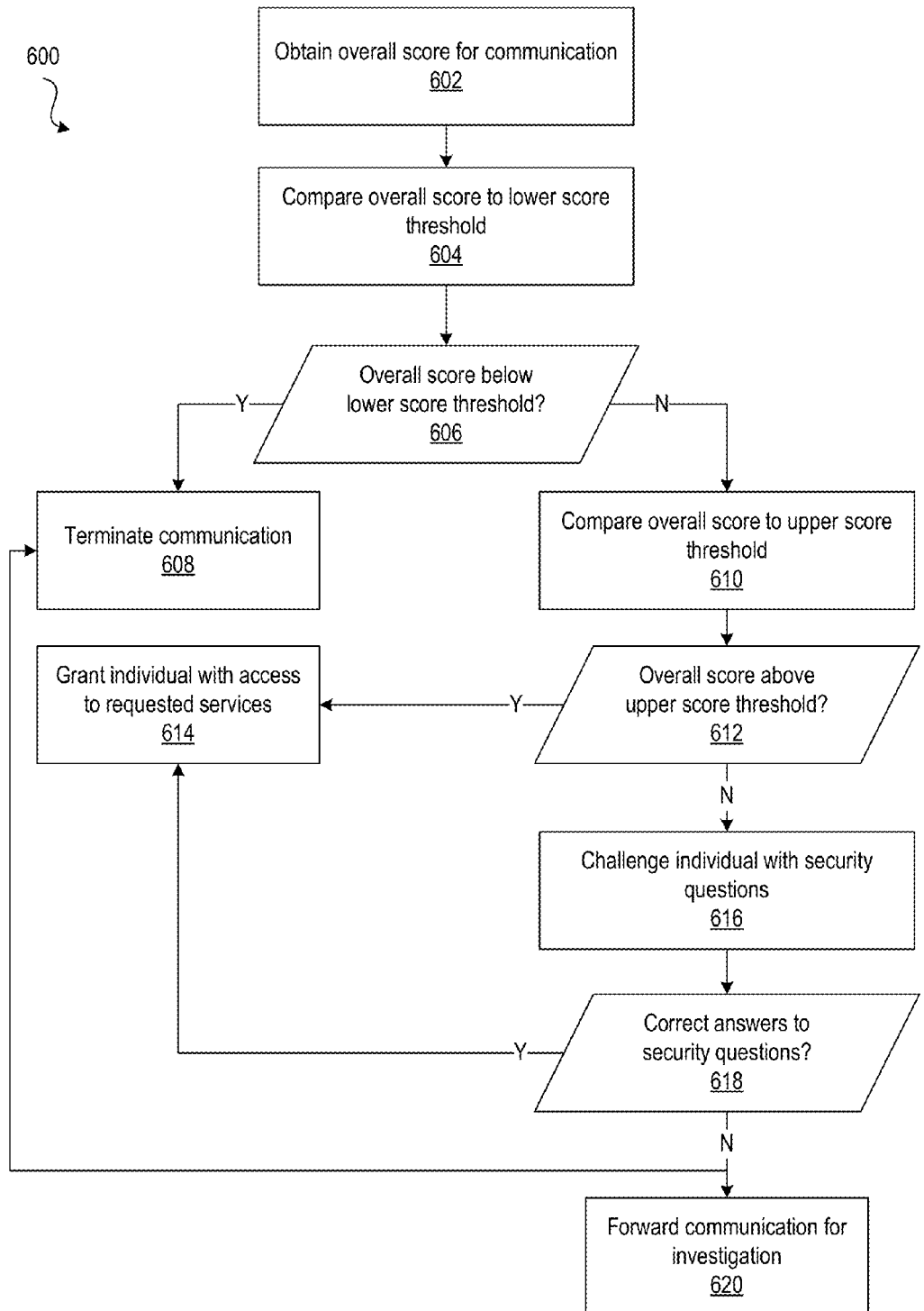
FIG. 6 is a flowchart of example method steps for determining a response to a communication based on an overall score for the communication.

In FIG. 6 is a flowchart 600 of example method steps for determining a response to a communication based on an overall score for the communication is shown. An overall score for the communication may be obtained (block 602) as described above. As mentioned above, the rules engine may employ thresholds to determine the response to the communication, e.g., an upper score threshold (e.g., 95/100) and a lower score threshold (70/100). The rules engine may first compare the overall score to the lower score threshold (block 604). If the overall score is below than the lower score threshold (block 606:Y), then the scoring system may determine Accordingly, the rules engine may determine to terminate the communication (block 608) and issue termination instructions to the routing engine. If the overall score is not below the lower score threshold (block 606:N), then the rules engine may compare the overall score to the upper score threshold (block 610). If the overall score is above the upper score threshold (block 612:Y), then the rules engine may determine to grant the individual access to the requested services (block 614).

If the overall score is between the lower score threshold and the upper score threshold—i.e., if the overall score is above the lower score threshold (block 606:N) but below the upper score threshold (block 612:N)—then additional steps may be performed in order to authenticate the individual. For example, the customer database may be queried for security questions and corresponding answers associated with the customer profile of the claimed identity of the individual. The individual may be challenged with one or more security questions (block 616), e.g., automatically through one of the communication portals or from a customer service agent.

If the user provides correct answers to the security questions (block 618:Y) then the rules engine may grant the individual access to the requested services (block 614). If, however, the user does not provide correct answers to the security questions (block 618:N), then the rules engine may determine to terminate the communication (block 608). Additionally or alternatively, the rules engine may forward the communication for investigation (block 620) if the user does not provide correct answers to the security questions. The rules engine may determine whether to grant access or terminate the communication based on a total number of security questions answered correctly or incorrectly. Additionally or alternatively, the rules engine may determine whether to grant access or terminate the communication based on a percentage of security questions answered correctly or incorrectly. In this way, the rules engine may accommodate one or more wrong answers from an individual before determining to terminate the communication.

Figure 7:
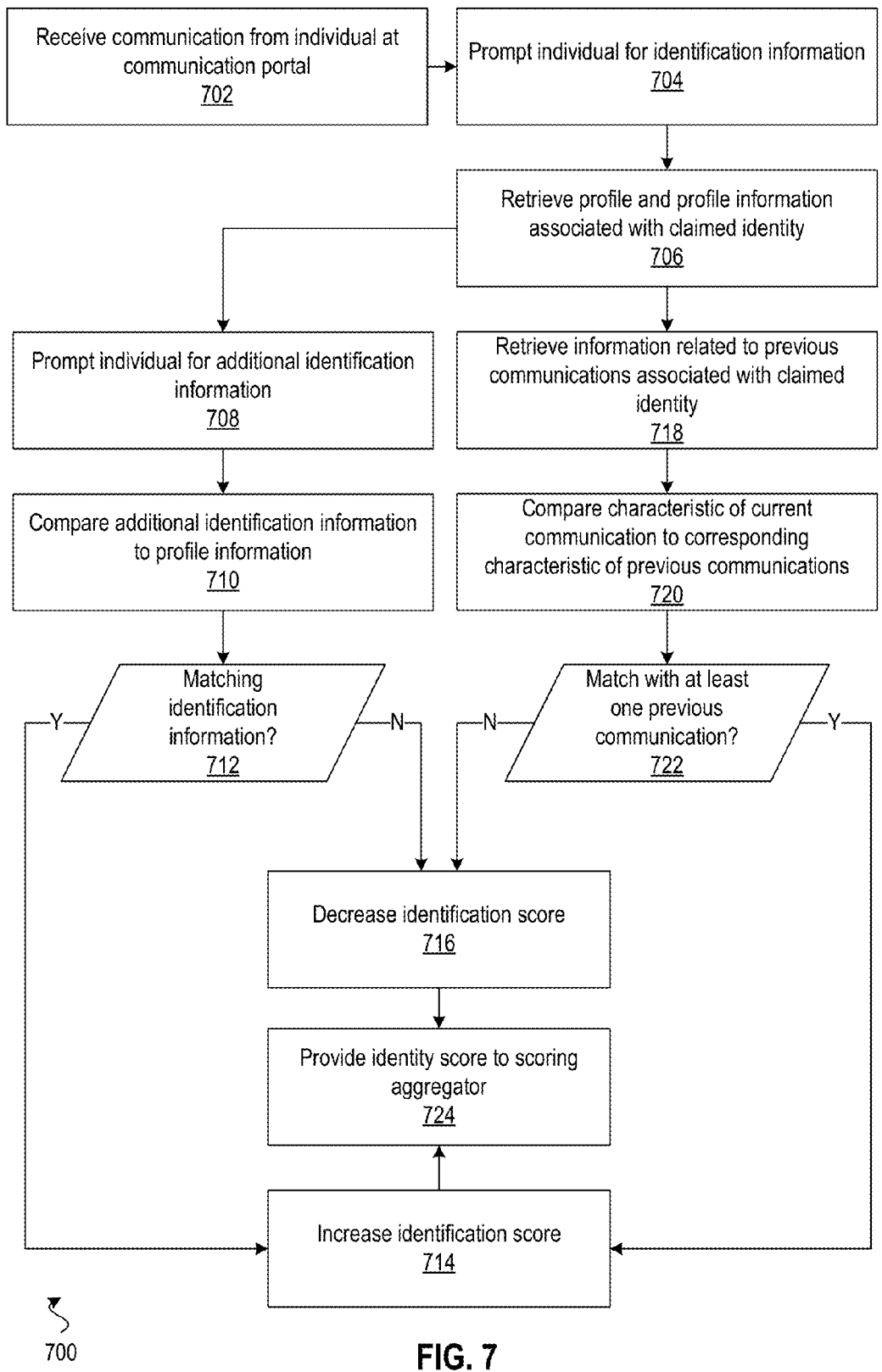
FIG. 7 is a flowchart of example method steps for determining an identification score for a communication.

In FIG. 7, a flowchart 700 of example method steps for determining an identification score for a communication is shown. A communication portal may receive a communication from an individual (block 702) and the identification engine may prompt the individual for identification information (block 704), e.g., an account number, customer number, or key phrase including a first and last name. The identification information may indicate a claimed identity of the individual. The identification engine may then retrieve a profile and corresponding profile information associated with the claimed identity of the individual (block 706).

The identification engine may then prompt the individual to provide additional identification information (block 708) for comparison to the profile information (block 710). For example, having determined a claimed identity, the identification engine may prompt the individual for a personal identification number (PIN) or birth date for comparison to the PIN or birth date stored with the profile for the claimed identity. If the additional identification information received from the customer matches the identity information stored with the profile for the claimed identity (block 712:Y), then the identification scoring engine may increase the identification score (block 714). If, however, the additional identification information received from the customer does not match the identity information stored with the profile for the claimed identity (block 712:N), then the identification scoring engine may increase the identification score (block 716).

In order to generate an identification score, the identification engine may also retrieve information associated with previous communications associated with the claimed identity (block 718). The identification engine may then provide to the identification scoring engine the communication information associated with the current communication received from the individual and the information associated with the previous communications for comparison. The identification scoring engine may then compare a characteristic of the current communication to corresponding characteristics of the previous communications (block 720). If the characteristic of the current communications matches a corresponding characteristic of at least one of the previous communications (block 722:Y), then the identification engine may increase the identification score (block 714). If, however, the characteristic of the current communication does not match a corresponding characteristic of any of the previous communications, then the identification scoring engine may decrease the identification score (block 716). As an example, the identification scoring engine may compare the source of the current communication to the source of previous communications, e.g., a phone number, network address, device identifier, or geographic location. In this example, if the source of the current communication matches the source of at least one of the previous communications, then the identification scoring engine may increase the identification score because the source of the current communication is recognized. If, however, the source of the current communication does not match the source of any of the previous communications, then the identification scoring engine may decrease the identification score because the source of the current communication is not recognized. Having determined the identification score, the identification scoring engine may provide the identification score to the scoring aggregator (block 724) to use for determining the overall score for the communication.

The identification engine may employ various approaches to determining the identity score. In some example implementations, the identification engine may sum a set of values (e.g., $x_1+x_2+x_3+ \ldots +x_n$) corresponding to identification information items. In this example, the identification engine may increase or decrease the identification score through the sign of each value, e.g., a positive sign (+) where identification information received from the customer matches stored identification information and a negative sign (−) where identification information received from the customer does not match the stored identification information.

In other example implementations, the identification engine may sum a set of weighted values (e.g., $(w_1 \times x_1)+(w_2 \times x_2)+(w_3 \times x_3)+ \ldots +(w_n \times x_n)$). In this example, the identification engine may increase or decrease the identification score by adjusting the weight of a value, e.g., a weight greater than zero where identification information received from the customer matches stored identification information and a weight less than or equal to zero where identification information received from the customer does not match the stored identification information. In further implementations, the identification engine may start with a based identification score and increase or decrease the identification score by adding to or subtracting from the base identification score when an individual provides identification information that matches or does not match the stored identification information. Other approaches to generating the identification score may be selectively employed.

The identification scoring engine may also refer to the rules engine for any rules directed towards generating the identification score. The rules engine may maintain, for example, rules specifying particular values or weights for certain types of identification information. In this way, some identification information items may contribute relatively more or less to the identification score. As an example, rules for the identification scoring engine may specify a relatively lower value or weight for an account number and a relatively higher value or weight for a PIN since a PIN may be less easily obtainable relative to an account number. Other examples will be appreciated.

Figure 8:
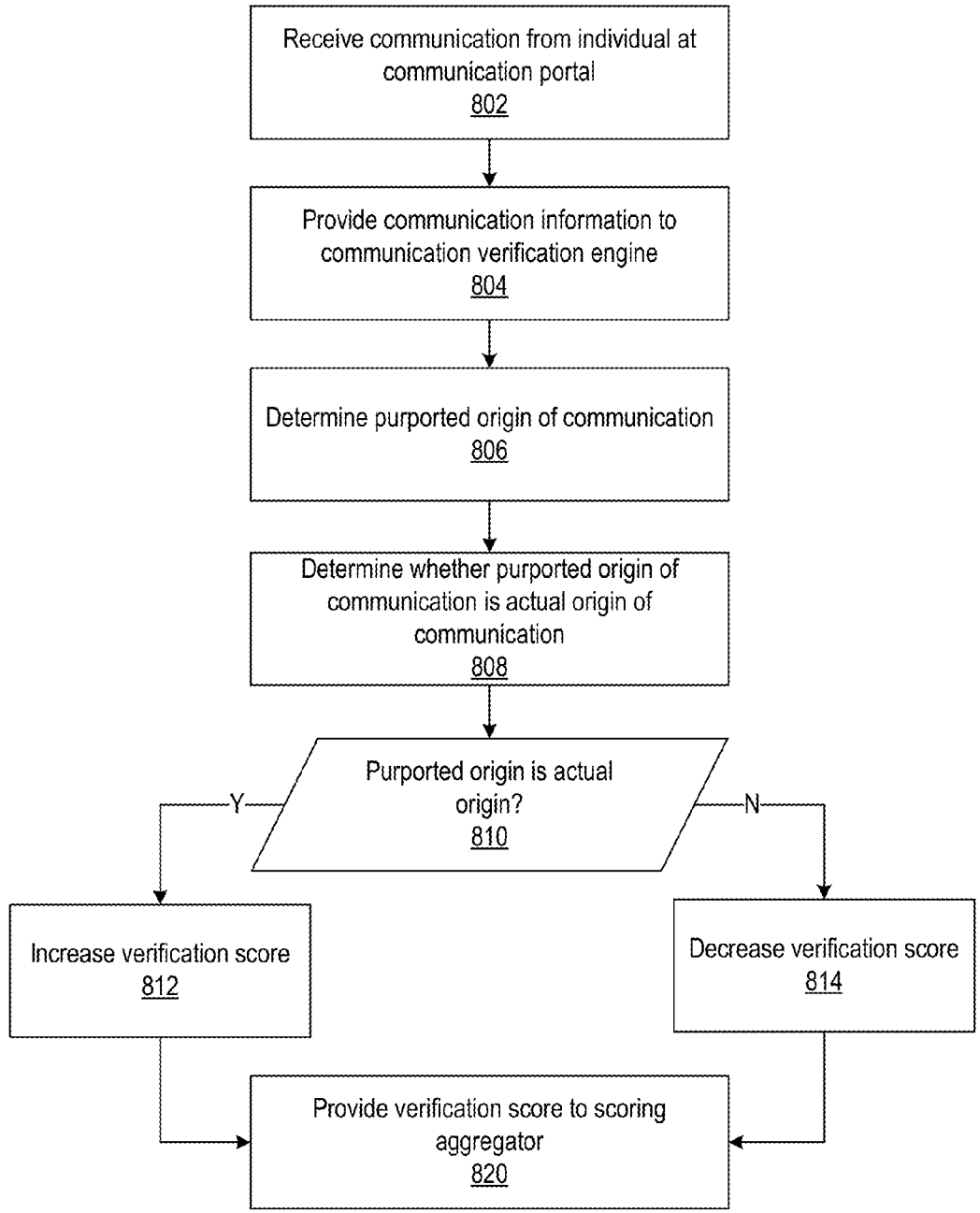
FIG. 8 is a flowchart of example method steps for determining a verification score for a communication.

In FIG. 8, a flowchart 800 of example method steps for determining a verification score for a communication is shown. A communication may be received from an individual at a communication portal (block 802), and the verification engine may receive communication information associated with the communication (block 804). The verification engine may determine the purported origin of the communication (block 806), e.g., the phone number, network address, device identifier, or geographic location the communication represents as having originated at. The verification engine may determine whether the purported origin of the communication is the actual origin of the communication (block 808).

If the purported origin of the communication is the actual origin of the communication (block 810:Y), then the verification engine may increase the verification score (block 812). If, however, the purported origin of the communication is not the actual origin of the communication (block 810:N), then the verification engine may decrease the verification score (block 814). The verification engine may provide the verification score to the scoring aggregator (block 820) to use for determining the overall score for the communication.

The verification engine may generate the verification score in a manner that is similar to the generation of the identification score described above. Additionally, the verification engine may verify multiple sources of the communication, e.g., the phone number and the geographic location a phone call represents as having originated at and, e.g., the network address, device identifier, and geographic location a mobile or online communication represents as having originated at. The verification scoring engine may also refer to the rules engine for any rules directed towards generating the verification score. The rules engine may maintain, for example, rules specifying particular values or weights for different types of sources of the communication. As an example, rules for the verification scoring engine may specify different weights for phone numbers, network address, device identifiers, and geographic locations. Other examples will be appreciated.

Figure 9:
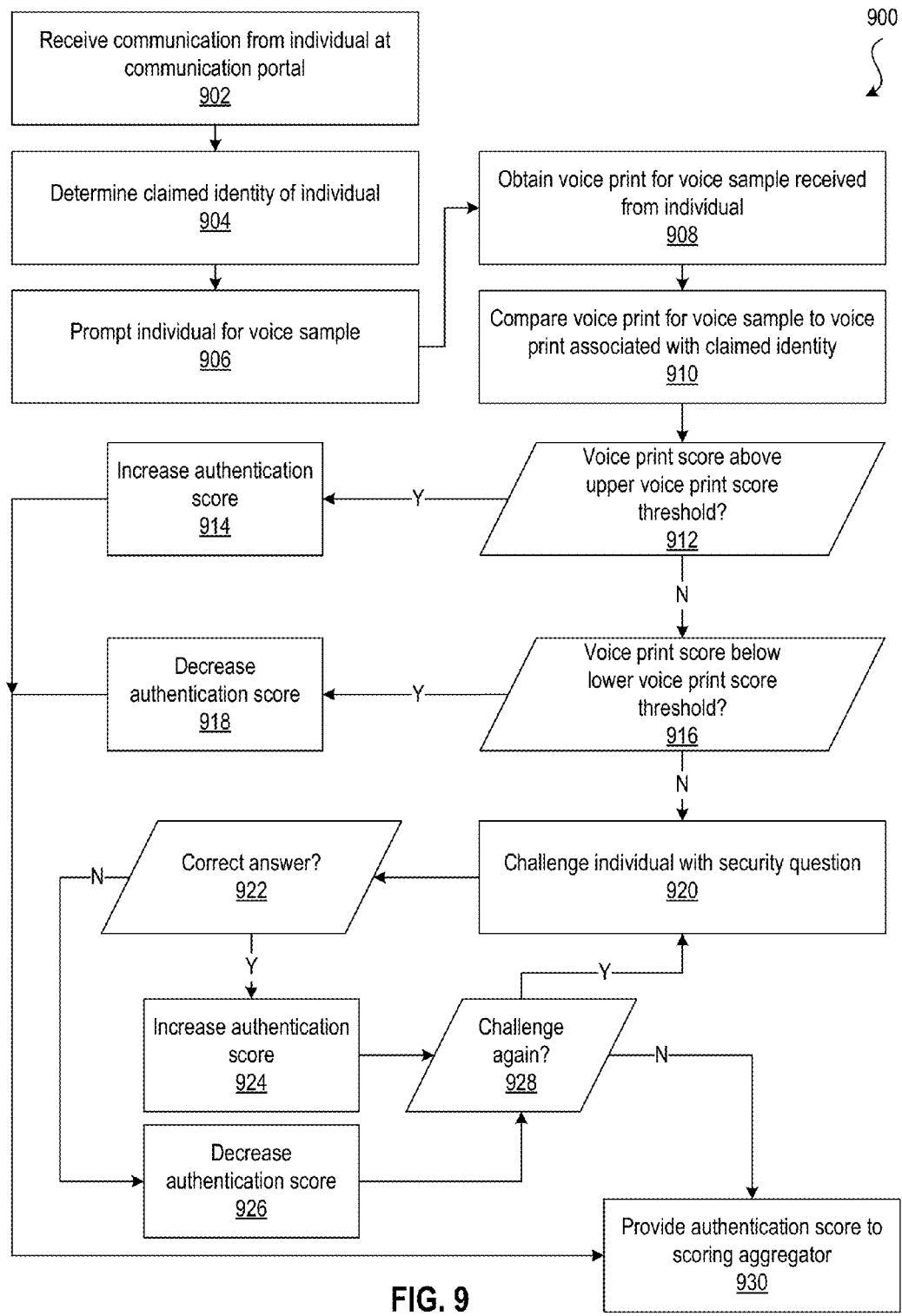
FIG. 9 is a flowchart of example method steps for determining an authentication score for a communication.

In FIG. 9, a flowchart 900 of example method steps for determining an authentication score for a communication is shown. In this example, the authentication score is generated through an analysis of a voice print of the individual and answers to knowledge-based authentication (KBA) security questions. A communication may be received from an individual at a communication portal (block 902), and a claimed identity of the individual may be determined (block 904). The authentication engine may prompt the individual for a voice sample (block 906) and obtain a voice print for the voice sample received (block 908). The authentication engine may then retrieve a stored voice print for the claimed identity and compare the voice prints (block 910), e.g., using a voice biometric engine. The voice biometric engine may provide a voice print score that indicates how closely the voice prints match. The authentication engine may then compare the voice print score to an upper and lower voice print score threshold. If the voice print score is above the upper voice print score threshold (block 912:Y), then the authentication engine may determine that the individual has been sufficiently authenticated and may increase the authentication score (block 914). If the voice print score is not above the upper voice print score threshold (block 912:N) and is below the lower voice print score (block 916:Y), then the authentication engine may determine that the individual cannot be authenticated and may decrease the authentication score (block 918).

If, however, the voice print score is between the upper voice score threshold and the lower voice score threshold, the authentication engine may perform additional steps to authenticate the individual. In this example, the authentication engine may challenge the individual with one or more security questions (block 920) and adjust the authentication score based on whether the individual provides correct answers to the security questions. If the individual provides a correct answer to a security question, then the authentication engine may increase the authentication score (block 924). If the individual provides an incorrect answer to a security question, then the authentication engine may decrease the authentication score (block 926). The authentication engine may challenge the individual with one or more security questions. If the individual answers a security question incorrectly, the authentication engine may again challenge the individual (block 928:Y) with another security question. Once the authentication engine is done challenging the individual (block 928:N), the authentication engine may provide the authentication score to the scoring aggregator (block 930) to use for determining the overall score for the communication.

The authentication engine may generate the authentication score in a manner that is similar to the generation of the identification score described above. The authentication scoring engine may also refer to the rules engine for any rules directed towards generating the authentication score. The rules engine may maintain, for example, rules specifying particular values or weights for different security questions, rules indicating how many security questions to challenge the individual with, and other types of rules directed towards authenticating the individual.

Figure 10:
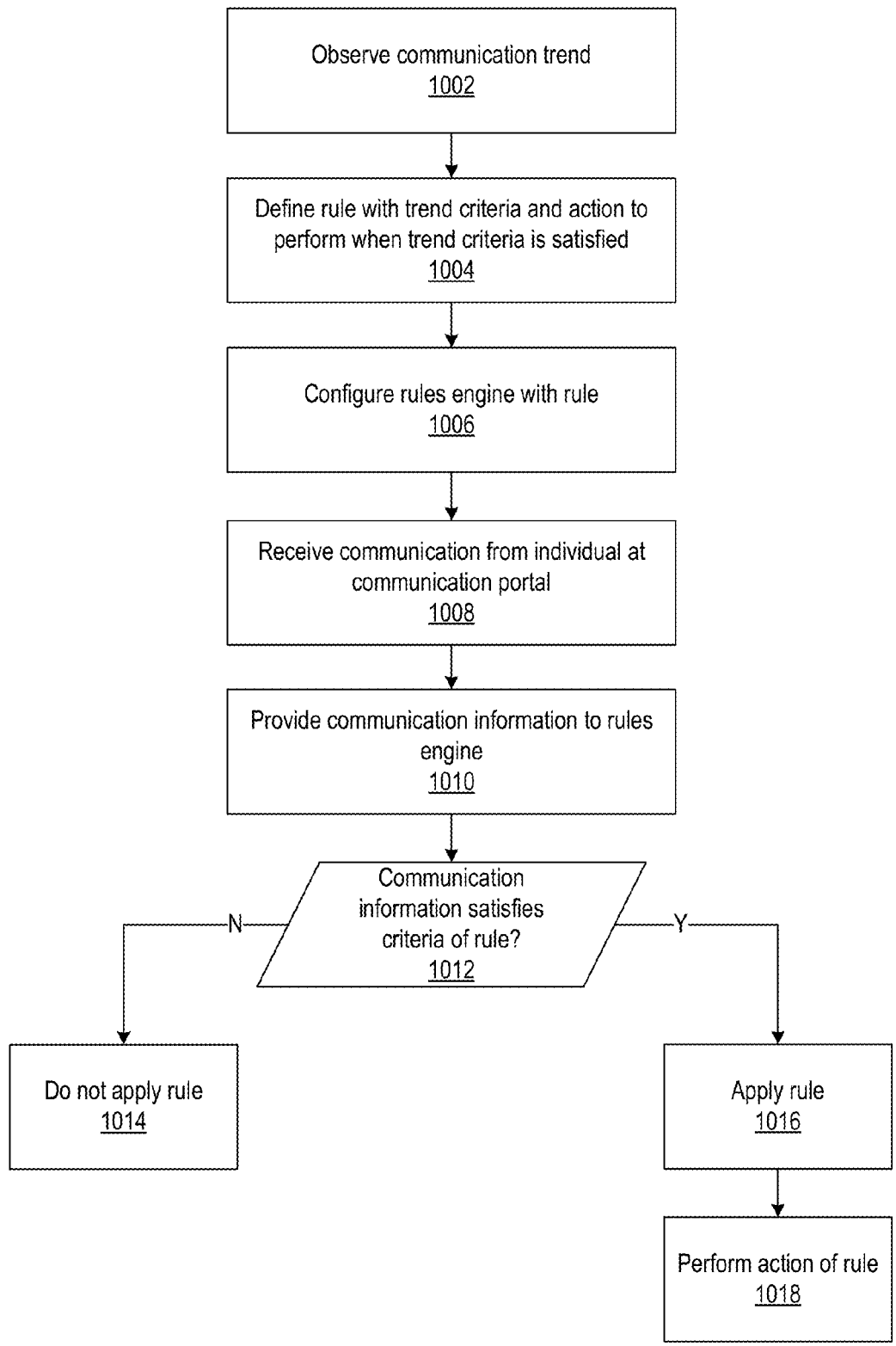
FIG. 10 is a flowchart of example method steps for configuring rules used to determine a response to a communication.

In FIG. 10, a flowchart 1000 of example method steps for configuring rules used to determine a response to a communication. In this example, the rules engine is configured with a rule to respond to a recent trend observed with respect to received communications (block 1002). The observed trend may relate to the characteristics of the communication itself (e.g., the source of the communication) as well as characteristics of the individual that sent the communication (e.g., the first and last name provided by the individual). In response to an observed trend a rule may be defined with trend criteria and an action to perform when the trend criteria is satisfied (block 1004). The trend criteria may also relate to, e.g., the characteristics of the communication or the individual that sent the communication. The action may indicate, e.g., how to route the communication or particular values to use when determining the identification, verification, or authentication score. The rules engine may thus be configured with any defined rules (block 1006).

A communication may then be received at a communication portal (block 1008), and communication information associated with the communication may be provided to the rules engine (block 1010). The rules engine may compare the communication information to one or more defined rules in order to determine whether the communication information satisfies the criteria of the rules (block 1012). In the criteria of a rule is not satisfied (block 1012:N), then the rules engine might not apply the rule (block 1014). If, however, the criteria of a rule is satisfied (block 1012:Y), then the rules engine may apply the rule (block 1016) and perform the action defined for the rule (block 1018).

As an example, a banking system may observe multiple phone calls originating from the same geographic location that misrepresent the phone number the call was placed from. Accordingly, the banking system may define a rule for this observed trend. The criteria for the rule may specify the geographic location associated with the trend, and the action for the rule may specify that phone calls satisfying the criteria should be sent for investigation. Accordingly, subsequent phone calls originating at the specified geographic location and misrepresenting their phone numbers may be forwarded to an investigation team by applying the rule. Other examples will be appreciated with the benefit of this disclosure.

Aspects of the disclosure have been described in terms of illustrative embodiments thereof. In particular, aspects of the present disclosure have been described by way of example in the context of determining whether to grant access to banking resources provided by a banking system. Numerous other embodiments, modifications and variations within the scope and spirit of the appended claims will occur to persons of ordinary skill in the art from a review of this disclosure. For example, aspects of the present disclosure may be implemented in other contexts where it is desirable to identify and authenticate an individual as well as verify communications received from the individual. Additionally, one of ordinary skill in the art will appreciate that the steps illustrated in the illustrative figures may be performed in other than the recited order, and that one or more steps illustrated may be optional in accordance with aspects of the disclosure.

What is claimed is:

1. A computer-implemented method of responding to a communication from an individual comprising:
    storing a set of identification rules comprising, for each of a plurality of identification information types, an identification rule that indicates a weight for that identification information type;
    storing a set of verification rules comprising, for each of a plurality of communication source types, a verification rule that indicates a weight for that communication type;
    receiving a communication from an individual requesting access to protected information;
    obtaining an identification score for the communication based on one or more identification information items, wherein the identification score indicates a likelihood that a claimed identity of the individual is an actual identity of the individual and wherein obtaining the identification score comprises weighting each identification information item of the one or more identification items according to the weight indicated in the identification rule for an identification information type of that identification information item;
    obtaining a verification score for the communication and weighting the verification score according to the weight indicated in the verification rule for a communication type of that communication, wherein the verification score indicates a likelihood that a purported source of the communication is an actual source of the communication;
    obtaining an authentication score for the communication wherein the authentication score indicates a likelihood that the individual has been authenticated;
    generating an overall score for the communication by aggregating the identification score, the verification score, and the authentication score; and
    determining whether to grant or deny the individual access to the protected information based on the overall score.

2. The method of claim 1 wherein determining whether to grant or deny the individual access to the protected information comprises one of:
    granting the individual access to the protected information when the overall score is above an upper score threshold; or
    denying the individual access to the protected information when the overall score is below a lower score threshold.

3. The method of claim 2 further comprising:
    forwarding the communication for investigation when the overall score is below the lower score threshold.

4. The method of claim 1 wherein determining the identification score includes:
retrieving a profile associated with the claimed identity;
prompting the individual for an identification token associated with the claimed identity;
comparing the identification token to a corresponding identification token associated with the profile;
increasing the identification score when the identification token matches the corresponding identification token; and
decreasing the identification score when the identification token does not match the corresponding identification token.

5. The method of claim 4 wherein the identification token is one of:
an access code;
an account number; and
a phrase spoken by the individual that includes a first name and a last name associated with claimed identity.

6. The method of claim 1 wherein determining the identification score includes:
retrieving information related to one or more previous communications associated with the claimed identity;
comparing a characteristic of the communication to respective corresponding characteristics of the one or more previous communications;
increasing the identification score when the characteristic of the communication matches the corresponding characteristic of one of the previous communications; and
decreasing the identification score when the characteristic of the communication does not match any of the corresponding characteristics of the one or more previous communications.

7. The method of claim 6 wherein:
the communication is a phone call and the characteristic of the communication is a phone number the phone call was called from; and
the previous communications are previous phone calls associated with the claimed identity and the corresponding characteristics are respective phone numbers the previous phone calls were called from.

8. The method of claim 6 wherein:
the communication is an online communication and a characteristic of the communication is a network address the online communication was received from; and
the previous communications are previous online communications associated with the claimed identity and the corresponding characteristics are respective network addresses the previous online communications were received from.

9. A system for responding to a communication received from an individual comprising:
one or more processors;
a data store storing (i) a set of identification rules comprising, for each of a plurality of identification information types, an identification rule that indicates a weight for that identification information type, and (ii) a set of verification rules comprising, for each of a plurality of communication source types, a verification rule that indicates a weight for that communication type;
memory storing computer-readable instructions that, when executed by one of the processors, cause the system to receive a communication requesting access to a service, generate an identification score based on one or more identification items, wherein the identification score indicates a likelihood that a claimed identity of the individual is an actual identity of the individual and wherein generating the identification score comprises weighting each identification information item of the one or more identification items according to the weight indicated in the identification rule for an identification information type of that identification information item,
generate a verification score for the communication and weigh the verification score according to the weight indicated in the verification rule for a communication type of that communication, wherein the verification score indicates a likelihood that a purported source of the communication is an actual source of the communication,
generate an authentication score for the communication wherein the authentication score indicates a likelihood that the individual has been authenticated,
generate an overall score for the communication by aggregating the identification score, the verification score, and the authentication score, and
determine whether to grant or deny access to the service based on the overall score.

10. The system of claim 9 wherein:
the instructions, when executed by one of the processors, further cause the system to
grant access to the service responsive to determining that the overall score is above an upper score threshold,
deny access to the service responsive to determining that the overall score is below a lower score threshold, and
prompt for authentication information responsive to determining that the overall score is below the upper score threshold and above the lower score threshold.

11. The system of claim 10 wherein:
the authentication information includes one or more answers received in response to one or more security questions presented; and
the instructions, when executed by one of the processors, further cause the system to determine whether to grant access to the service based on a number of correct answers of the one or more answers received.

12. The system of claim 9 wherein the instructions, when executed by one of the processors, further cause the system to:
obtain identification information related to an individual that initiated the communication and determine the identification score based, at least in part, on the identification information obtained;
obtain verification information related to the purported source of the communication and determine the verification score based, at least in part, on the verification information obtained; and
obtain authentication information related to the individual and determine the authentication score based, at least in part, on the authentication information obtained.

13. The system of claim 12 wherein:
the communication is a phone call;
the purported source of the phone call is a purported phone number the call was received from;
the actual source of the phone call is an actual phone number the call was received from; and
the instructions, when executed by one of the processors, further cause the system to obtain the verification information by determining whether the purported phone number the phone call was received from is the actual phone number the phone call was received from.

14. The system of claim 12 wherein:
the communication is an online communication;

the purported source of the online communication is a purported network address the online communication was received from;

the actual source of the online communication is an actual network address the online communication was received from; and the instructions, when executed by one of the processors, further cause the system to obtain the verification information by determining whether the purported network address the online communication was received from is the actual network address the online communication was received from.

15. The system of claim 12 wherein:

the purported source of the communication is a purported geographic location the communication originated at;

the actual source of the communication is an actual geographic location the communication originated at; and the instructions, when executed by one of the processors, further cause the system to obtain the verification information by determining whether the purported geographic location the communication originated at is the actual geographic location the communication originated at.

16. The system of claim 9 wherein:

the instructions, when executed by one or the processors, further cause the system to respond to the communication according to one or more rules based on whether one or more criteria of the one or more rules are satisfied; and the criteria relate to at least one of one or more characteristics associated with the individual, one or more characteristics associated with the communication, and combinations thereof.

17. Non-transitory computer-readable media having instructions that, when executed, cause a computing device to:

store a set of identification rules comprising, for each of a plurality of identification information types, an identification rule that indicates a weight for that identification information type;

store a set of verification rules comprising, for each of a plurality of communication source types, a verification rule that indicates a weight for that communication type;

receive a communication from an individual at a communication portal wherein the communication requests access to one or more banking services from a banking system;

obtain an identification score for the communication based on one or more identification items, wherein the identification score indicates a likelihood that a claimed identity of the individual is an actual identity of the individual and wherein obtaining the identification score comprises weighting each identification information item of the one or more identification items according to the weight indicated in the identification rule for an identification information type of that identification information item;

obtain a verification score for the communication and weigh the verification score according to the weight indicated in the verification rule for a communication type of that communication, wherein the verification score indicates a likelihood that a purported source of the communication is an actual source of the communication;

obtain an authentication score for the communication wherein the authentication score indicates a likelihood that the individual has been authenticated;

generate an overall score for the communication by aggregating the identification score, the verification score, and the authentication score; and grant the individual accesses to the one or more banking services responsive to determining that the overall score is above an upper score threshold; and decline to grant the individual access to the one or more banking services responsive to determining that the overall score is below a lower score threshold.

18. The computer-readable media of claim 17 wherein the instructions, when executed, further cause the computing device to:

obtain identification information related to the individual and determine the identification score based, at least in part, on the identification information obtained;

obtain verification information related to the purported source of the communication and the verification score based, at least in part, on the verification information obtained; and obtain authentication information related to the individual and determine the authentication score based, at least in part, on the authentication information obtained.

19. The computer-readable media of claim 18 wherein the instructions, when executed, further cause the computing device to:

present one or more security questions to the individual wherein the authentication information includes one or more answers received from the individual in response to the security questions presented to the individual; and prompt the individual for a voice sample, obtain a voice print for the voice sample, obtain a stored voice print associated with claimed identity of the individual, and compare the voice print to the stored voice print in order to obtain a voice print score wherein the authentication information includes the voice print score.

20. The computer-implemented method of claim 1 further comprising:

storing a set of trending rules wherein each trending rule in the set of trending rules specifies (i) trending criteria that, if satisfied, indicates a received communication is part of a communication trend, and (ii) an action to perform in response to determining that the trending criteria has been satisfied;

wherein the set of trending rules comprise a first trending rule that specifies first trending criteria that is satisfied when a threshold number of communications originating from a geographic location are determined to have misrepresented its respective geographic location; and wherein a first action specified by the first trending rule comprises forwarding for investigation a subsequent communication determined to have originated at the geographic location.

* * * * *